(12) United States Patent
Sridhar et al.

(10) Patent No.: US 10,837,487 B2
(45) Date of Patent: Nov. 17, 2020

(54) BEARING ASSEMBLY AND METHOD

(71) Applicant: Transportation IP Holdings, LLC, Norwalk, CT (US)

(72) Inventors: Mandyam Rangayan Sridhar, Bangalore (IN); Ravindra Shankar Ganiger, Bangalore (IN); Dinesh R. Rakwal, Bangalore (IN); Ajith Kuttannair Kumar, Erie, PA (US); Bret Dwayne Worden, Union City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/366,046

(22) Filed: Mar. 27, 2019

(65) Prior Publication Data

US 2019/0301526 A1 Oct. 3, 2019

(30) Foreign Application Priority Data

Mar. 29, 2018 (IN) .............................. 201841011968

(51) Int. Cl.
| | | |
|---|---|---|
| *F16C 19/24* | (2006.01) | |
| *F16C 19/04* | (2006.01) | |
| *F16C 25/08* | (2006.01) | |
| *F01D 25/16* | (2006.01) | |
| *F16C 41/00* | (2006.01) | |

(Continued)

(52) U.S. Cl.
CPC ............ *F16C 19/24* (2013.01); *F01D 25/162* (2013.01); *F16C 19/04* (2013.01); *F16C 25/083* (2013.01); *F16C 35/067* (2013.01); *F16C 41/00* (2013.01); *F16C 19/54* (2013.01); *F16C 2240/12* (2013.01);
(Continued)

(58) Field of Classification Search
CPC .......... F16C 19/04; F16C 19/24; F16C 19/54; F16C 35/067; F16C 35/077; F16C 25/083; F16C 41/00; F16C 2226/16; F16C 2226/50; F16C 2240/12; F16C 236/02; F01D 25/162; Y10T 29/49696
USPC ........ 384/513, 517–519, 538–539, 548–549, 384/561, 585, 903, 906
See application file for complete search history.

(56) References Cited

U.S. PATENT DOCUMENTS

| | | | | |
|---|---|---|---|---|
| 1,924,937 A | * | 8/1933 | Leister ................. | F16C 35/067 384/513 |
| 2,277,635 A | * | 3/1942 | Delaval-Crow ...... | F16C 35/067 384/542 |

(Continued)

FOREIGN PATENT DOCUMENTS

DE 102014203487 A1 * 8/2015 ............ F16C 35/067

*Primary Examiner* — Marcus Charles
(74) *Attorney, Agent, or Firm* — McCoy Russell LLP

(57) ABSTRACT

A bearing assembly is disclosed. The bearing assembly includes a first race. Further, the bearing assembly includes a second race disposed concentric to the first race, where the second race has a radius that changes along an axial length of the bearing assembly. The bearing assembly also includes a housing disposed around the second race and operatively coupled to the second race. Moreover, the bearing assembly includes a plurality of support structures configured to detachably couple the second race to the housing, where the plurality of support structures are configured to disengage the second race from the housing to allow motion of the second race when a torque on the second race is greater than a threshold torque value.

18 Claims, 6 Drawing Sheets

(51) Int. Cl.
  *F16C 25/06* (2006.01)
  *F16C 19/54* (2006.01)
  *F16C 35/067* (2006.01)

(52) U.S. Cl.
  CPC ..... *F16C 2326/02* (2013.01); *Y10T 29/49696* (2015.01)

(56) References Cited

U.S. PATENT DOCUMENTS

| | | | | |
|---|---|---|---|---|
| 2,607,642 A * | 8/1952 | Gilbert | .................. | F16C 35/067 384/539 |
| 3,888,597 A * | 6/1975 | Datta | .................... | F16B 21/18 403/326 |
| 4,192,472 A * | 3/1980 | Johnson | .................. | B02C 2/045 241/215 |
| 4,511,191 A * | 4/1985 | Kitamura | .............. | F16C 35/067 384/536 |
| 5,316,393 A * | 5/1994 | Daugherty | ............ | F16C 25/083 384/517 |
| 6,715,925 B2 * | 4/2004 | Pairone | .................. | D06F 37/00 384/536 |
| 6,860,639 B2 * | 3/2005 | Tabuchi | ................ | F16C 35/067 384/513 |
| 7,967,512 B2 * | 6/2011 | Himeda | ................ | F16C 33/586 384/539 |
| 8,172,065 B2 * | 5/2012 | Kamm | .................. | B65G 39/09 193/37 |
| 9,273,772 B2 * | 3/2016 | Ichikawa | ................ | F16H 55/48 |
| 9,435,373 B2 * | 9/2016 | Boufflert | ............... | F16C 25/083 |
| 9,702,404 B2 * | 7/2017 | Smedresman | .......... | F16C 27/04 |
| 9,863,469 B2 * | 1/2018 | Shimizu | ................ | F16C 19/385 |
| 9,926,975 B2 * | 3/2018 | Smedresman | ........ | F16C 27/045 |
| 2011/0081231 A1 * | 4/2011 | Hoelzer | ............... | F04D 19/042 415/119 |
| 2011/0120797 A1 * | 5/2011 | Kitahata | .................. | B62D 5/04 180/443 |
| 2015/0198084 A1 * | 7/2015 | Daimer | ................... | F02B 47/08 415/62 |
| 2015/0308504 A1 * | 10/2015 | Katsaros | ................ | F16C 25/08 384/125 |
| 2016/0040554 A1 * | 2/2016 | Hovhannisian | ..... | F16C 33/6659 415/170.1 |

* cited by examiner

BEARING ASSEMBLY AND METHOD

CROSS REFERENCE TO RELATED APPLICATIONS

The present application claims priority to Indian Patent Application No. 201841011968, entitled "BEARING ASSEMBLY AND METHOD", and filed on Mar. 29, 2018. The entire contents of the above-listed application are hereby incorporated by reference for all purposes.

BACKGROUND

Technical Field

Embodiments of the specification relate to a bearing assembly and method.

Discussion of Art

Drive trains are employed in a vehicle to enable motion of the vehicle. A drive train may include a motor coupled to a wheel of a vehicle via a shaft, a bearing, and a gearbox. The motor rotates the wheel.

A failure in the bearing may result in a failure of the drive train and the vehicle. This condition may be referred to as a locked axle condition. The bearing may fail due to various reasons, such as lack of lubrication, accumulation of dirt, design issues, misalignment, and the like. In the event of failure in the bearing, other components of the drive train may also fail.

It may be desirable to have a system and method for detecting an anomalous state in a drive train that differs from those systems and methods that are currently available.

BRIEF DESCRIPTION

In accordance with aspects of the present specification, a bearing assembly is presented. The bearing assembly includes a first race. Further, the bearing assembly includes a second race disposed concentric to the first race, where the second race has a radius that changes along an axial length of the bearing assembly. Furthermore, the bearing assembly includes a housing disposed around the second race and operatively coupled to the second race. Moreover, the bearing assembly includes a plurality of support structures configured to detachably couple the second race to the housing, where the plurality of support structures are configured to disengage the second race from the housing to allow motion of the second race when a torque on the second race is greater than a threshold torque value.

In accordance with another aspect of the present specification, a method is presented. The method includes providing, through the use of a rotating machine, a first torque to a bearing assembly to rotate a first race of the bearing assembly; disengaging a second race of the bearing assembly from a housing to allow motion of the second race when a second torque on the second race is greater than a threshold torque value; and analyzing, using a controller, one or more operational parameters corresponding to at least the rotating machine to detect a presence of an anomaly in the bearing assembly.

In accordance with yet another aspect of the present specification, a system is presented. The system includes a bearing assembly. The bearing assembly includes a first race; a second race disposed concentric to the first race, where the second race has a radius that changes along an axial length of the bearing assembly; a housing disposed around the second race and operatively coupled to the second race; and a plurality of support structures configured to detachably couple the second race to the housing, where the plurality of support structures are configured to disengage the second race from the housing to allow motion of the second race when a torque on the second race is greater than a threshold torque value. The system further includes a rotating machine operatively coupled to the bearing assembly and a controller configured to analyze one or more operational parameters corresponding to at least the rotating machine to detect presence of an anomaly in the bearing assembly.

BRIEF DESCRIPTION OF THE DRAWINGS

These and other features, and aspects of the disclosure will be understood when the following detailed description is read with reference to the accompanying drawings in which like characters represent like parts throughout the drawings, wherein.

DETAILED DESCRIPTION

Figure 1:
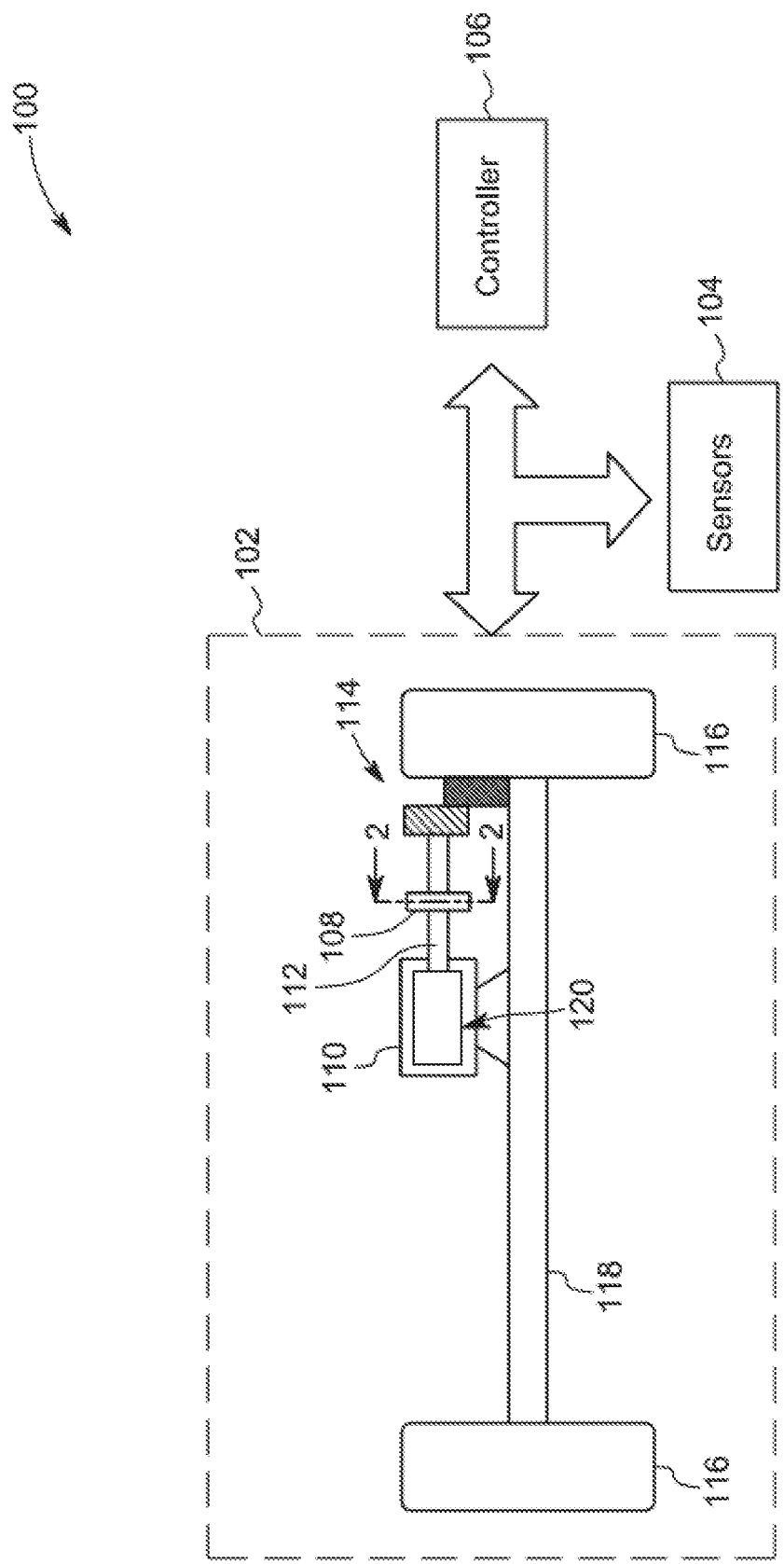
FIG. 1 is a schematic representation of a system having an exemplary bearing assembly, according to aspects of the specification.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function. Exemplary is defined herein as serving as an example and does not infer a preference of a specific part, configuration, functionality, etc.

As will be described in detail hereinafter, various embodiments of a system having an exemplary bearing assembly and a method of operating the system having the exemplary bearing assembly are presented. In one example, the system includes a vehicle. The vehicle may be a locomotive, an off-highway vehicle, and the like. The vehicle includes a drive train. The drive train may be an electrical drive train or a mechanical drive train. The exemplary bearing assembly may form a part of the drive train. In addition, the drive train includes a rotating machine. The rotating machine may be an alternator, a motor, and the like. The rotating machine is coupled to one or more wheels of the vehicle via a rotor, a shaft, the bearing assembly, and a transmission gear. Further, one wheel of the vehicle is coupled to another wheel using an axle. As will be appreciated, the rotating machine aids in rotation of the wheels of the vehicle, thereby allowing motion of the vehicle.

According to aspects of the specification, the exemplary bearing assembly includes a first race, a second race, a housing, and a plurality of support structures. The second race is disposed concentric to the first race. In one embodiment, the second race is disposed around the first race. In this embodiment, the first race may be referred to as an inner race and the second race may be referred to as an outer race. Further, a plurality of rollers are disposed between the first and second races. In accordance with aspects of the specification, the second race has a radius varying along an axial length of the bearing assembly. Additionally, the first race is operatively coupled to the rotor of the rotating machine.

During a normal operating condition of the bearing assembly, the first race is configured to rotate and the second race is configured to be stationary. In one example, the rotation of the first race enables rotation of the rotor of the rotating machine. In accordance with aspects of the specification, the second race is coupled to the housing using the plurality of support structures, where the housing is a stationary structure.

Typically, the bearing assembly is prone to failure. The bearing assembly may fail due to various reasons, such as lack of lubrication, accumulation of dirt, design issues, misalignment, and the like. In one example, an anomaly in the bearing assembly includes a locked state of the first race and/or clogged rollers. In such a condition, the first race and the rollers may not rotate. In conventional systems, due to the non-rotation of the first race, the rotor of the rotating machine may no longer rotate. In such a situation, if the vehicle includes the bearing assembly, a corresponding axle of the vehicle may be in a locked state. When the axle of the vehicle is in the locked state, the vehicle may abruptly stop moving on the roads/tracks. In this scenario, in order to move the vehicle, the locked axle may need to be cut on the tracks/roads. In another scenario, the vehicle may need to be hoisted and subsequently transported to a repair facility. At least some shortcomings of the conventionally existing systems are circumvented by use of the exemplary bearing assembly, described herein.

In accordance with aspects of the specification, an exemplary bearing assembly is presented. The bearing assembly is designed such that even in the event of occurrence of an anomaly in the bearing assembly, such as a locked state of the first race and/or clogged rollers, use of the bearing assembly in the vehicle allows the vehicle to move for a determined period of time, thereby preventing an abrupt vehicle stop. In one example, in the event of locked state of the first race in the bearing assembly, the torque experienced by the second race may be greater than a determined threshold value of torque for the second race. Consequently, the torque on the support structures may be greater than a determined threshold value of torque for the support structures. As described herein, a determined value indicates a known property of a designated component. It will be appreciated that the determined value may be predetermined, designated, or otherwise calculated and is indicative of a particular value. In such a situation, the support structures may shear, thereby enabling rotation of the second race. The rotation of the second race results in an anomalous rotation of the rotor of the rotating machine. As a result of anomalous rotation of the rotor, the rotation of the corresponding axle is not hindered, allowing for continued motion of the vehicle. In this scenario, the vehicle may be configured to move for a determined period of time, for example for about 6 hours, to at least enable transportation of the vehicle to a nearby repair facility. This may allow cutting of the axle on the tracks/roads to be avoided. As will be appreciated, the cutting of axle on the tracks/roads may be very expensive. Also, enabling motion of the vehicle for the determined period of time avoids a cumbersome step of hoisting and transporting the vehicle to the nearby repair facility.

It may be noted that the anomalous rotation of the rotor of the rotating machine causes variations in operational parameters of the drive train. The operational parameters of the drive train include operational parameters of the rotating machine and associated transmission gears. It may be noted that operational parameters of a drive train may vary even in systems employing conventional bearing assemblies. However, use of the exemplary bearing assembly aids in magnifying the variations in the operational parameters due to the anomalous rotation of the rotor, thereby aiding in easy identification of anomalies in the bearing assembly via analysis of the operational parameters.

In one example, the anomaly in the exemplary bearing assembly may be identified by monitoring and analyzing the operational parameters of at least the rotating machine and the associated transmission gears. In addition to the operational parameters of the rotating machine and the associated transmission gears, operational parameters associated with other components of the drive train may also be monitored and analyzed. In one example, the operational parameters of the rotating machine and associated transmission gears include a current/voltage of a rotating machine, torque/vibration of transmission gears, and the like. The operational parameters of the drive train may be monitored using currently available drive train sensors, such as a current sensor, a voltage sensor, a vibration sensor, an acoustic sensor, and the like. Further, the operational parameters of the drive train may be analyzed using the currently available signal processing techniques. Use of the currently available sensors in the drive train and currently available signal processing techniques to monitor the operational parameters to identify the anomaly in the exemplary bearing assembly circumvents the need for any additional sensors/signal processing techniques, if desired.

The specification is described with respect to a vehicle employing the bearing assembly. The use of the bearing assembly in drive trains employed in systems other than vehicles is also anticipated.

Turning now to the drawings, FIG. 1 is a schematic diagram of system 100 having an exemplary bearing assembly 108, according to aspects of the specification. In one example, the system 100 is a vehicle. The system 100 includes a drive train 102, sensors 104, and a controller 106 operatively coupled to one another. The drive train 102 includes the exemplary bearing assembly 108, a rotating machine 110, a shaft 112, transmission gears 114, a plurality of wheels 116, and an axle 118. In the example of FIG. 1, the rotating machine 110 is shown as an integral part of the drive train 102. In another example, the rotating machine 110 may be external to the drive train 102. The rotating machine 110 may be a motor or a generator. Further, the rotating machine 110 includes a rotor 120. In one embodiment, the rotor 120 is coupled to the bearing assembly 108 via the shaft 112. Further, the bearing assembly 108 is coupled to a corresponding wheel of the plurality of wheels 116 via corresponding transmission gears 114. Furthermore, the wheels 116 are coupled to one another using the axle 118. For ease of representation, only one axle, a corresponding set of wheels, and corresponding drive train components are represented in FIG. 1.

In accordance to aspects of the specification, the bearing assembly 108 includes a first race (not shown in FIG. 1) and a second race (not shown in FIG. 1). The second race is disposed concentric to the first race. In one embodiment, the second race is disposed around the first race. Furthermore, a plurality of rollers (not shown in FIG. 1) are disposed between the first race and the second race. In accordance with aspects of the specification, the second race has a radius that changes along an axial length of the bearing assembly 108. The bearing assembly 108 also includes a housing (not shown in FIG. 1) disposed around the second race. Moreover, the bearing assembly 108 includes a plurality of support structures (not shown in FIG. 1) configured to detachably couple the second race to the housing. The plurality of support structures are configured to disengage the second race from the housing to allow motion of the second race when a torque on the second race is greater than a determined threshold torque value for the second race.

During a normal operating condition of the bearing assembly 108, the first race is configured to rotate. In this scenario, the first race forms the rotational element of the bearing assembly 108. A rotor 120 of the rotating machine 110 is coupled to the first race. As a result of rotation of the first race, the rotor 120 rotates.

As will be appreciated, various conditions may lead to the failure of the bearing assembly 108. In one example, an anomaly in the bearing assembly 108 includes a locked state of the first race and clogged rollers. However, other anomalous states have been contemplated.

In conventional systems, when the first race is in the locked state and the rollers are clogged, a torque incident on the rotating machine and the transmission gears increases, thereby causing damage of the rotating machine and the transmission gears. Also, when the first race of the bearing assembly employed in the vehicle is in a locked state and/or if the rollers are clogged, the rotor coupled to the first race stops rotating. Subsequently, the vehicle employing the bearing assembly may abruptly stop moving. In such a scenario, the vehicle may need to be hoisted from road/track to a repair facility and/or the axle need to be cut on the road/track. At least some shortcomings of the conventional systems are circumvented by use of the exemplary bearing assembly 108.

In accordance with aspects of the specification, even in the event of an anomaly in the bearing assembly 108 employed in the vehicle, the vehicle may be configured to continue to move for a determined period of time, thereby preventing the vehicle from abruptly stopping on the road/tracks. In one embodiment, in the event of the locked state of the first race and clogged rollers of the bearing assembly 108, the first race fails to rotate even upon application of a torque. As a result, the second race may be subject to an increased torque.

Due to a continued increase of torque experienced by the second race, at a certain instance in time, the torque experienced by the second race may be greater than the determined threshold value of torque for the second race. In this situation, torque on the support structures is greater than the determined threshold value of torque for the support structures. The support structures shear when the torque on the support structures is greater than the determined threshold value of torque for the support structures. The shearing of the support structures results in the rotation of the second race. In this scenario, the second race forms the rotational element of the bearing assembly 108. Additionally, in one example, the first race, the second race, and the combination of rollers work together as a single unit and rotate. The rotation of the second race may result in an anomalous rotation of the rotor 120 of the rotating machine 110. In one embodiment, the rotation of the second race aids in eccentrically rotating the rotor 120 of the rotating machine 110. This anomalous rotation of the rotor 120 in turn aids in moving the axle 118 of vehicle even in the event of the locked state of the first race of the bearing assembly 108. The design of the bearing assembly 108 facilitates movement of the vehicle for the determined period of time as a result of motion of the axle 118.

Moreover, the anomalous rotation of the rotor 120 causes variations in operational parameters of the drive train 102. In one example, the anomalous rotation of the rotor 120 causes variations in a magnetic air gap of the rotating machine 110. These variations in the magnetic air gap in turn results in variations in the operational parameters of the rotating machine 110. Non-limiting examples of the operational parameters of the rotating machine 110 include a current/voltage/torque of the rotating machine. In another example, the anomalous rotation of the rotor 120 causes variations in the operational parameters of other components of the drive train 102, such as the transmission gear 114. Some non-limiting examples of the operational parameters of the rotating machine 110 and/or the transmission gears 114 include a current of the rotating machine 110, a speed of the rotating machine 110, a torque of the rotating machine 110, a vibration signal of the transmission gear 114, an acoustic signal of the transmission gear 114, or combinations thereof.

The operational parameters of the drive train 102 and its various components are measured using the sensors 104 that are operatively coupled to the drive train 102. The sensors 104 may include a speed sensor, a current sensor, a voltage sensor, a torque sensor, an acoustic sensor, a vibration sensor, or combinations thereof. In one embodiment, the sensors 104 are configured to measure the operational parameters of at least one of the rotating machine 110 and the transmission gears 114. It may be noted that the sensors 104 that are currently employed with the drive train 102, thereby circumventing the need for any additional sensors, if desired.

Furthermore, the operational parameters measured by the sensors 104 are analyzed by the controller 106. As used herein, the term "controller" refers to integrated circuits (ICs), a computer, a microcontroller, a microcomputer, a programmable logic controller (PLC), an application specific integrated circuit (ASIC), application-specific processors, digital signal processors (DSPs), Field Programmable Gate Arrays (FPGAs), and/or any other programmable circuits. The controller 106 is configured to analyze one or more of the operational parameters to identify the presence of an anomaly in the bearing assembly 108. In one example, conventional signal processing techniques are employed for analyzing the operational parameters. Further, the anomaly includes the motion of the second race, an eccentric rotation of the rotor 120 of the rotating machine 110, the locked state of the first race, clogged rollers of the bearing assembly, or combinations thereof. The structure of the bearing assembly 108 and method of operating the drive train using the bearing assembly 108 will be explained in greater detail with respect to FIGS. 2-6.

Figure 2:
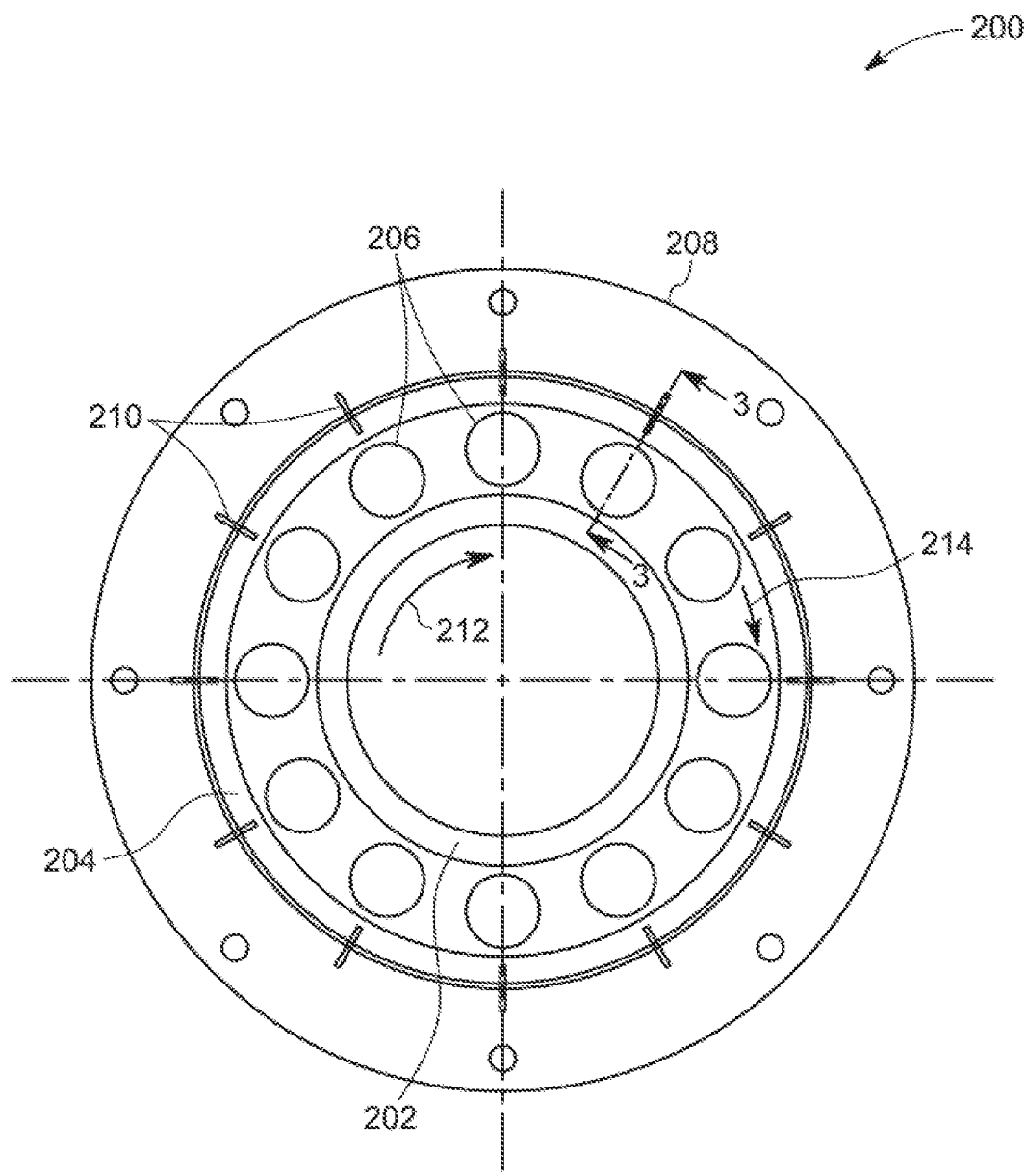
FIG. 2 is a cross-sectional representation of one embodiment of the bearing assembly of FIG. 1, according to aspects of the specification.

FIG. 2 is a cross-sectional representation 200 of one embodiment of the bearing assembly 108 of FIG. 1, according to aspects of the specification. In particular, FIG. 2 is a cross-sectional view along the line 2-2 of FIG. 1. The bearing assembly 200 includes a first race 202, a second race 204, a plurality of rollers 206, a housing 208, and a plurality of support structures 210. The second race 204 is disposed concentric to the first race 202. Further, the second race 204 is disposed around the first race 202.

The second race 204 has a radius that changes along an axial length (shown in FIG. 3) of the bearing assembly 200. The housing 208 is disposed at least around the second race 204 and is operatively coupled to the second race 204 via the support structures 210. In one embodiment, the second race 204 may be a tapered cylindrical structure. In another embodiment, the second race 204 may be a uniform cylindrical structure having a tapered sleeve disposed around the uniform cylindrical structure. The structure of the second race will be explained in greater detail with respect to FIGS. 3-4.

The support structures 210 are configured to detachably couple the second race 204 to the housing 208. In one example, the support structure 210 is a shear pin that may be configured to shear based on a value of torque on the second race 204, thereby facilitating decoupling the second race 204 from the housing 208. More generally, the support structure 210 may be designed with features that result in the structure remaining intact when torques are applied to the structure below a designated level and shearing or otherwise severing when torques are applied to the structure above the designated level. For instance, the support structure may include shear pins that may have cylindrical metal shafts with reduced diameter sections (e.g., grooves) which may be positioned at or near mid-points of the pins. In other instances, the support structure may include shear pins having cylindrical shapes in which weaker materials are included that are designed to shear when the designated torque level is surpassed. The weaker material may be positioned at or near the mid-points of the pin. However, in other examples, the support structure may include materials, sections, etc., designed to crumple, compress, or fragment to allow for movement of the structure when applied torque exceeds the designated level, but does not shear or sever. The support structure may include, in further examples, frangible links, hollow sections, or other structures that shear, crumple, compress, or fragment, as mentioned above. In certain embodiments, the number of support structures 210 employed may be 12. Use of a greater or lower number of support structures for coupling the second race 204 to the housing 208 has also been contemplated.

During a normal operating condition of the bearing assembly 200, the first race 202 is configured to rotate and the second race 204 is configured to be stationary. Reference numeral 212 is representative of the direction of rotation of the first race 202. The bearing assembly 200 is coupled to a rotor (not shown in FIG. 2) of a rotating machine (not shown in FIG. 2). In particular, the first race 202 is coupled to the rotor of the rotating machine. In one example, upon application of a torque, the first race 202 rotates. The rotation of the first race 202 aids in rotating the rotor.

In certain situations, the rollers 206 may be in a clogged condition and the first race 202 may be in a locked state. In this condition, the first race 202 is unable to rotate in response to any applied torque. Due to the inability of the first race 202 to rotate, the second race 204 is subject to an increased torque. In one scenario, the torque on the second race 204 may exceed a determined threshold value of torque for the second race 204. In such a scenario, the torque on the support structures 210 increases beyond a determined threshold value of torque for the support structures 210, thereby causing the support structures 210 to shear. This shearing of the support structures 210 results in the motion of the second race 204. Subsequently, the second race 204 rotates in a direction 214. In such a scenario, the first race 202, the second race 204, and the rollers 206 function as a single unit that rotates. In this example, the rotation of the second race 204 may cause the rotor to rotate anomalously. The anomalous rotation of the rotor enables motion of a vehicle employing the bearing assembly 200 even in the event of an anomaly in the bearing assembly 200. In this situation, the vehicle may be moved for a determined time period, for example for about 6 hours to at least allow transport of the vehicle to a nearby repair facility.

Additionally, the anomalous rotation of the rotor causes operational parameters of a drive train employing the bearing assembly 200 to vary. The operational parameters of the drive train are monitored and subsequently analyzed to detect anomalies in the bearing assembly 200 using currently available drive train sensors and signal processing techniques.

Figure 3:
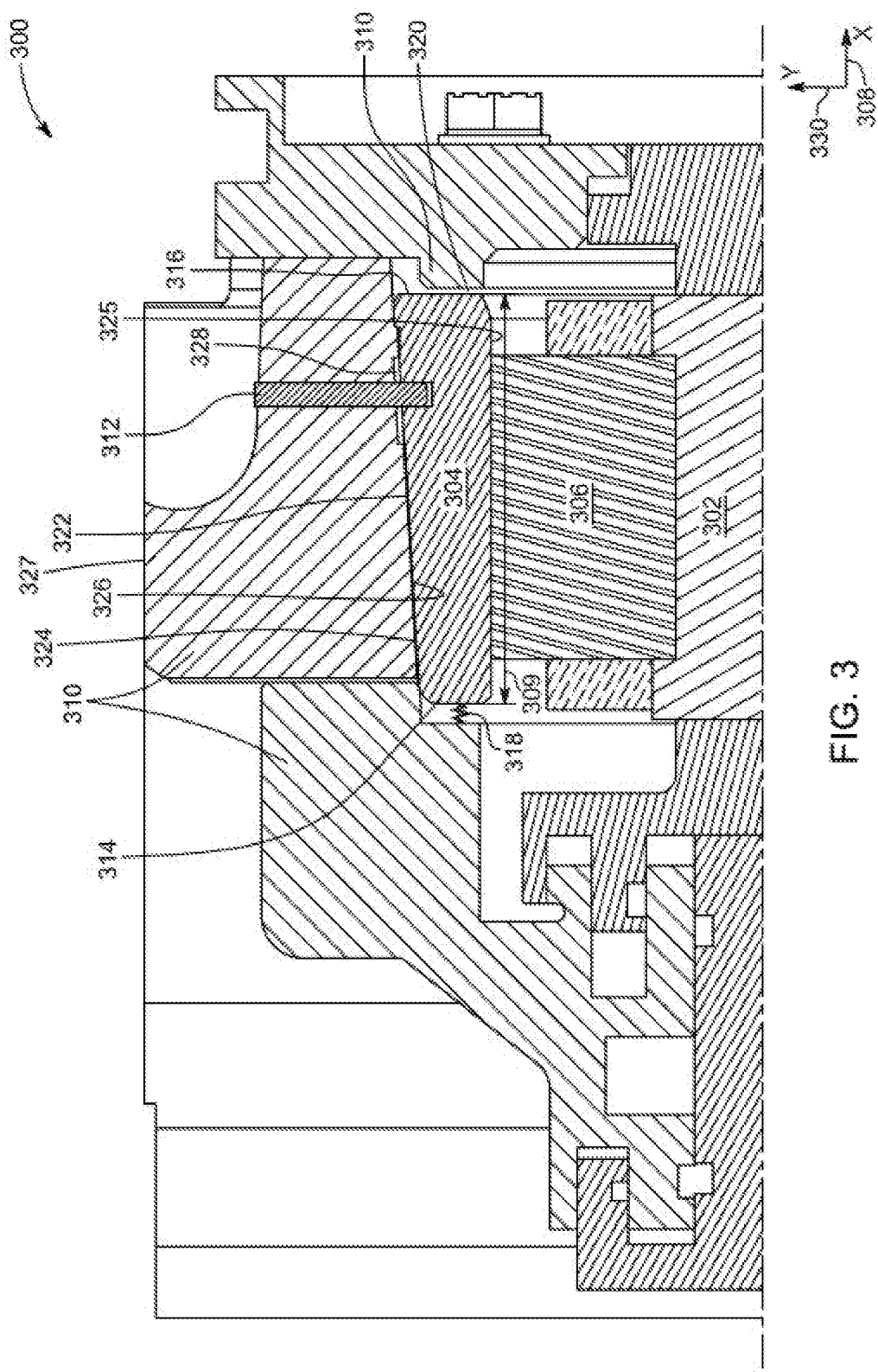
FIG. 3 is another cross-sectional representation of one embodiment of the bearing assembly of FIG. 1, according to aspects of the specification.

FIG. 3 is another cross-sectional representation 300 of one embodiment of the bearing assembly 108 of FIG. 1, according to aspects of the specification. In particular, FIG. 3 represents a cross sectional view along the line 3-3 of FIG. 2.

In the example of FIG. 3, the bearing assembly 300 includes a first race 302 and a second race 304. A roller 306 is disposed between the first and second races 302, 304. In one example, the first race 302 is a cylindrical structure having uniform inner and outer radii. In particular, the first race 302 is a cylindrical structure having an inner radius and an outer radius. In one embodiment, the second race 304 has a tapered cylindrical structure. In such an embodiment, an inner radius of the second race 304 is uniform and an outer radius of the second race 304 varies along an axial length 309 of the bearing assembly 300. In this embodiment, the outer radius of the second race 304 varies along an axial direction 308 of the bearing assembly 300. Accordingly, the second race 304 has a tapered outer surface.

In one example, the second race 304 is a monolithic structure. As used herein the term "monolithic structure" refers to a continuous structure that is substantially free of any joints. In one example, the monolithic structure may be a unitary structure devoid of any joined parts or layers. In some embodiments, the monolithic second race 304 may be formed as one structure during processing, without any brazing or multiple sintering steps.

In the example of FIG. 3, the bearing assembly 300 includes a housing 310 and a support structure 312. The second race 304 is detachably coupled to the housing 310 using the support structure 312. The second race 304 includes a first end 314 and a second end 316. The first end 314 of the second race 304 is coupled to the housing 310 using a coupling device 318. The coupling device 318 includes a spring, such as a Belleville spring. Further, a clearance gap 320 is provided between the second end 316 of the second race 304 and the housing 310.

Moreover, in FIG. 3, the support structure 312 is disposed along a radial direction 330. In another embodiment, a support structure may be disposed along an axial direction, such as along the axial direction 308. In the embodiment where the support structure is disposed along the axial direction 308, the support structure may be disposed between the second end 316 of the second race 304 and the housing 310.

Further, the second race 304 has an outer surface 324 and an inner surface 325. Similarly, the housing 310 has an outer surface 327 and an inner surface 326. The bearing assembly 300 may include a lubricating medium reservoir 328 disposed at an interface of the outer surface 324 of the second race 304 and the inner surface 326 of the housing 310. In one embodiment, the lubricating medium reservoir 328 may be disposed about the support structure 312. In another embodiment, the lubricating medium reservoir 328 may be disposed at a determined distance from the support structure 312. The lubricating medium reservoir 328 is configured to store a lubricant which is then provided to the interface of the outer surface 324 of the second race 304 and the inner surface 326 of the housing 310. In one example, the lubricant is oil. In another example, the lubricant is grease.

Moreover, the bearing assembly 300 includes an interface layer 322 that is disposed on at least one of the outer surface 324 of the second race 304 and the inner surface 326 of the housing 310. The interface layer 322 includes a plurality of indentations, where the indentations are configured to hold a determined volume of the lubricant.

As noted above with respect to FIGS. 1-2, in the event of an anomaly in the bearing assembly 300, the second race 304 moves and subsequently rotates. In one example, the anomaly in the bearing assembly 300 includes a locked state of the first race 302. In the event of the locked state of the first race 302, torque on the second race 304 exceeds a determined threshold value of torque for the second race 304. As a result, torque on the support structure 312 exceeds a determined threshold value of torque for the support structure 312. Exceeding the threshold torque value may cause the support structure 312 to shear. The shearing of the support structure 312 causes the second race 304 to move. Specifically, the second race 304 is configured to transition from a stationary state to a dynamic state. The term "stationary state," as used herein, is a state in which the second race 304 does not move. The term "dynamic state," as used herein, is a state in which the second race 304 is subject to rotation, linear motion, and the like. In one embodiment, the second race 304 is displaced along the axial direction 308 by the coupling device 318 into the clearance gap 320. Subsequently, the second race 304 rotates about the axial direction 308. In one embodiment, the second race 304 rotates anomalously about the axial direction 308. Further, the interface layer 322 provides reduced friction (e.g., substantially frictionless) motion of the second race 304 with respect to the housing 310. The structure of the interface layer 322 will be explained in greater detail with respect to FIGS. 5A and 5B.

In one example, the bearing assembly 300 is coupled to a rotor (not shown in FIG. 3) of a rotating machine (not shown in FIG. 3). In particular, the first race 302 is operatively coupled to the rotor of the rotating machine. In the event of the anomalous rotation of the second race 304, the rotor rotates anomalously. In one example, the rotor rotates eccentrically. The eccentric rotation of the rotor causes operational parameters of a drive train employing the bearing assembly 300 to vary. The operational parameters of the drive train are monitored and subsequently analyzed to detect anomalies in the bearing assembly 300 using currently available drive train sensors and signal processing techniques.

Further, anomalous rotation of the rotor enables motion of a vehicle employing the bearing assembly 300 even in the event of an anomaly in the bearing assembly 300. In this situation, the vehicle may move for a determined time period to at least allow for the transport of the vehicle to a nearby repair facility.

Figure 4:
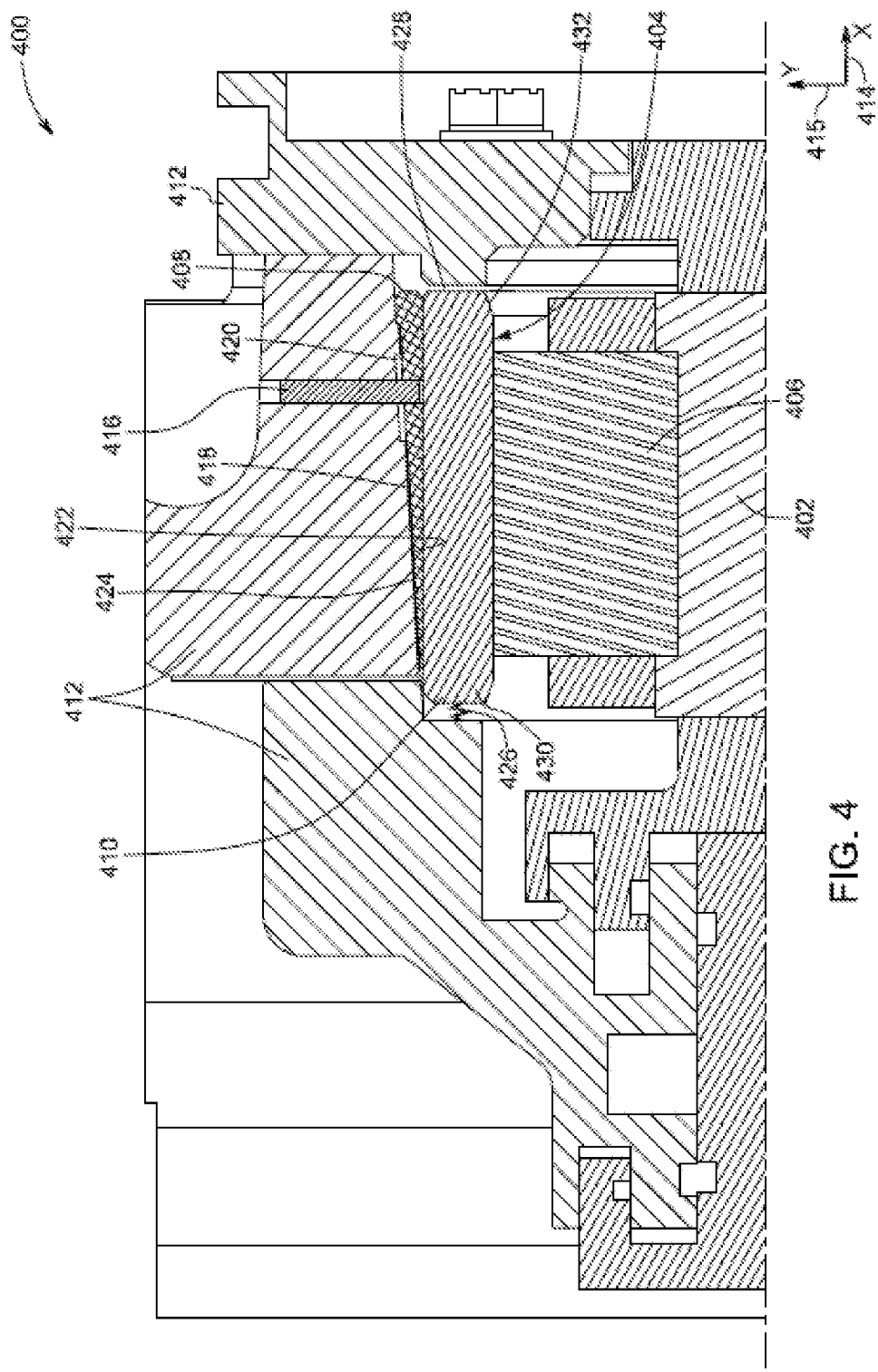
FIG. 4 is a cross-sectional representation of another embodiment of the bearing assembly of FIG. 1, according to aspects of the specification.

FIG. 4 is a cross-sectional representation 400 of another embodiment of the bearing assembly 108 of FIG. 1, according to aspects of the specification. Specifically, FIG. 4 depicts a cross sectional view along the line 3-3 of FIG. 2 of a different embodiment of the bearing assembly 108 of FIG. 1.

The bearing assembly 400 includes a first race 402, a second race 404, a housing 412, and a support structure 416. The first race 402 is a cylindrical structure having a uniform inner radius and a uniform outer radius. A roller 406 is disposed between the first race 402 and the second race 404. The second race 404 includes a sleeve 408 and a cylindrical subunit 410. The cylindrical subunit 410 has a cylindrical structure. In this embodiment, the cylindrical subunit 410 has a uniform inner radius and a uniform outer radius. The sleeve 408 and cylindrical subunit 410 are distinct pieces held together as a single unit between the housing 412 and the roller 406.

In one example, the cylindrical subunit 410 is disposed concentric to the first race 402. Further, the sleeve 408 is disposed around and concentric to the cylindrical subunit 410. In one embodiment, the sleeve 408 has an outer radius which increases along an axial direction 414. Reference numeral 415 depicts a radial direction. In this embodiment, the sleeve 408 has a uniform inner radius. In the example, of FIG. 4, the sleeve 408 is coupled to the housing 412 using the support structure 416.

Further, the bearing assembly 400 includes an interface layer 418 and a lubricating medium reservoir 420. The lubricating medium reservoir 420 is disposed at an interface of an outer surface 422 of the sleeve 408 and an inner surface 424 of the housing 412. In one embodiment, the lubricating medium reservoir 420 is disposed about the support structure 416. The lubricating medium reservoir 420 is configured to store a lubricant, such as oil, grease, and the like, which may then be supplied to the interface of the outer surface 422 of the sleeve 408 and the inner surface 424 of the housing 412.

Moreover, the interface layer 418 may be disposed on at least one of the outer surface 422 of the sleeve 408 and the inner surface 424 of the housing 412. The interface layer 418 includes a plurality of indentations. In one example, the indentations are configured to hold the lubricant.

Also, the bearing assembly 400 includes a coupling device 426. The coupling device 426 aids in coupling a first end 430 of the cylindrical subunit 410 to the housing 412. The coupling device 426 aids in displacing a second end 432 of the cylindrical subunit 410 into a clearance gap 428 between the cylindrical subunit 410 and the housing 412. In one example, the coupling device 426 is a spring, such as Belleville spring.

In the event of an anomaly in the bearing assembly 400, the second race 404 moves and rotates. In one example, the anomaly in the bearing assembly 400 includes a locked state of the first race 402. In this example, torque on the second race 404 increases beyond a threshold value of torque for the second race 404. As a result, torque on the support structure 416 increases beyond a threshold value of torque for the support structure 416. Hence, the support structure 416 shears. As a result of shearing of the support structure 416, the sleeve 408 and the cylindrical subunit 410 are displaced along the axial direction 414. In one example, the cylindrical subunit 410 is displaced into the clearance gap 428 using the coupling device 426. Subsequent to displacement of the sleeve 408 and the cylindrical subunit 410, the second race 404 anomalously rotates about the axial direction 414. The interface layer 418 aids in providing reduced friction (e.g., substantially friction-less) motion of the second race 404 with respect to the housing 412. The structure of the interface layer 418 will be explained in greater detail with respect to FIGS. 5A and 5B.

In one example, a rotor (not shown in FIG. 4) is coupled to the bearing assembly 400. Particularly, the rotor is coupled to the first race 402 of the bearing assembly 400. In one example, the rotor has a cylindrical structure. Further, the rotor includes a first end and a second end, where the first end of the rotor is coupled to the bearing assembly 400. In the event of the anomalous rotation of the second race 404, the rotor rotates anomalously (e.g., eccentrically). The anomalous rotation of the rotor includes an angular change in an axis of rotation of the rotor relative to the axial direction 414. The angular change in the axis of rotation of the rotor includes a displacement of the second end of the rotor due to gravitational force. In another example, the anomalous rotation of the rotor is such that the axis of rotation of the rotor moves in such a manner to traverse a conical profile with a base of the conical profile formed at the first end of the rotor.

The eccentric rotation of the rotor causes operational parameters of a drive train employing the bearing assembly 400 to vary. The operational parameters of the drive train include a current of the rotating machine, a speed of the rotating machine, a torque of the rotating machine, a vibration signal of associated transmission gear, an acoustic signal of the associated transmission gear, or combinations thereof. The operational parameters are monitored and subsequently analyzed to detect anomalies in the bearing assembly 400 using currently available drive train sensors and signal processing techniques. Use of currently available drive train sensors allows the use of additional sensors to be avoided, if desired.

Further, the anomalous rotation of the rotor enables motion of a vehicle employing the bearing assembly 400 even in the event of an anomaly in the bearing assembly 400. In this situation, the vehicle may be moved for a determined time-period to at least allow transport of the vehicle to a nearby repair facility.

Figure 5A:
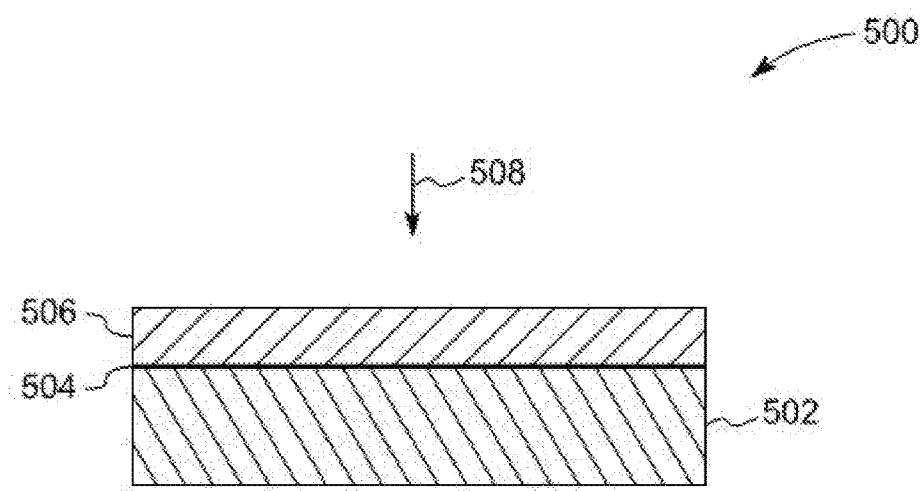
FIGS. 5A-5B are detailed representations of an interface layer used in the bearing assembly of FIG. 1, according to aspects of the specification.
Figure 5B:
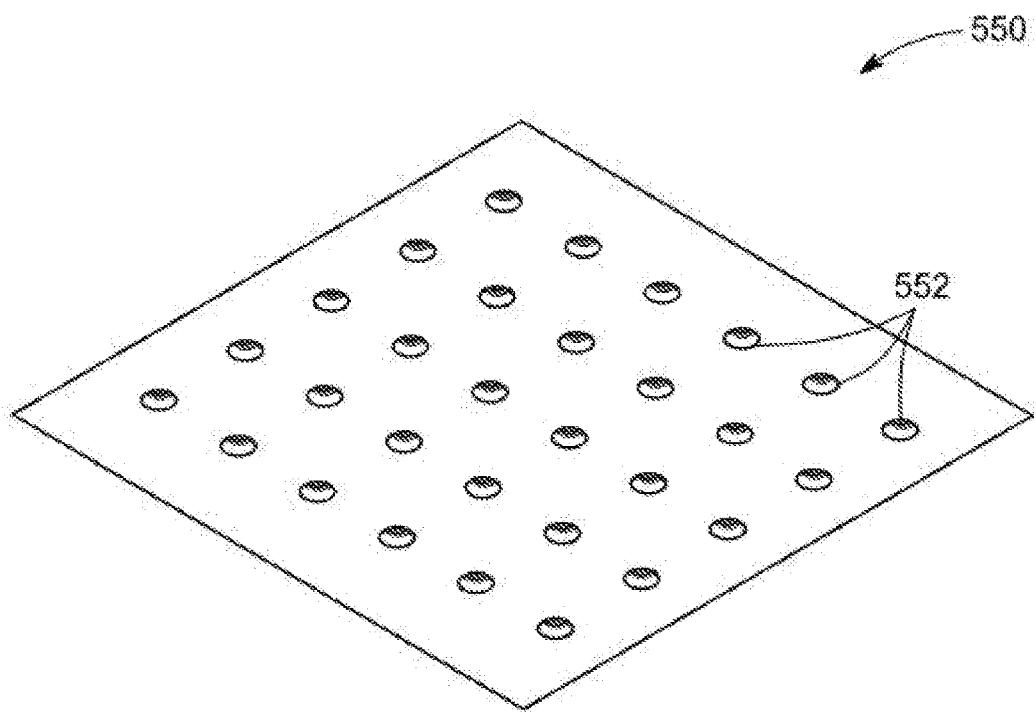

FIGS. 5A-5B are detailed representations of an interface layer used in the bearing assembly of FIG. 1, according to aspects of the specification. In particular, FIG. 5A, is a detailed representation of an interface layer 500. The interface layer 500, shown in FIG. 5A, is an example of the interface layer 322 of FIG. 3 or the interface layer 418 of FIG. 4. In one example, the interface layer 500 is a coating. In one example, the coating is a journal bearing coating, such as spluttered Aluminum Tin (AlSn). The interface layer 500 includes a first film 502, a second film 504, and a third film 506. The second film 504 is disposed on the first film 502. Further, the third film 506 is disposed on the second film 504. In this embodiment, the second film 504 is disposed between the first film 502 and the third film 506. In one embodiment, the interface layer 500 is disposed in a manner such that the first film 502 is disposed in direct contact with at least one of an inner surface of a housing and an outer surface of a second race.

The first film 502 is a tribo-material based film. In one embodiment, the first film 502 includes an Aluminum (Al) or Copper (Cu) based material. In one example, the first film 502 has a thickness of about 0.5 millimeter (mm). The second film 504 forms an intermediate film that may have a thickness of about 0.003 mm. Also, the third film 506 may form a top overlay film and includes a metallic or organic material. In this example, the thickness of the third film 506 is about 0.02 mm. The interface layer 500 includes a plurality of pores. In one embodiment, porosity of the interface layer 500 may be in a range from about 1% to about 4% of a volume of the interface layer 500.

FIG. 5B is a top view 550 of the interface layer 500 of FIG. 5A. In particular, FIG. 5B is a detailed top view of the interface layer 500 of FIG. 5A along a direction 508. The interface layer 550 includes a plurality of indentations 552. The indentations 552 are configured to hold a determined volume of a lubricant, such as oil, grease, and the like. In one embodiment, a depth of each indentation 552 is lower than 10 micrometers. Further, a diameter of each indentation 552 may vary from about 50 micrometers to about 150 micrometers. The interface layer 550 aids in providing a lubricated interface between the second race and the housing for enabling a reduced friction (e.g., substantially frictionless) rotation of the second race of the bearing assembly.

Figure 6:
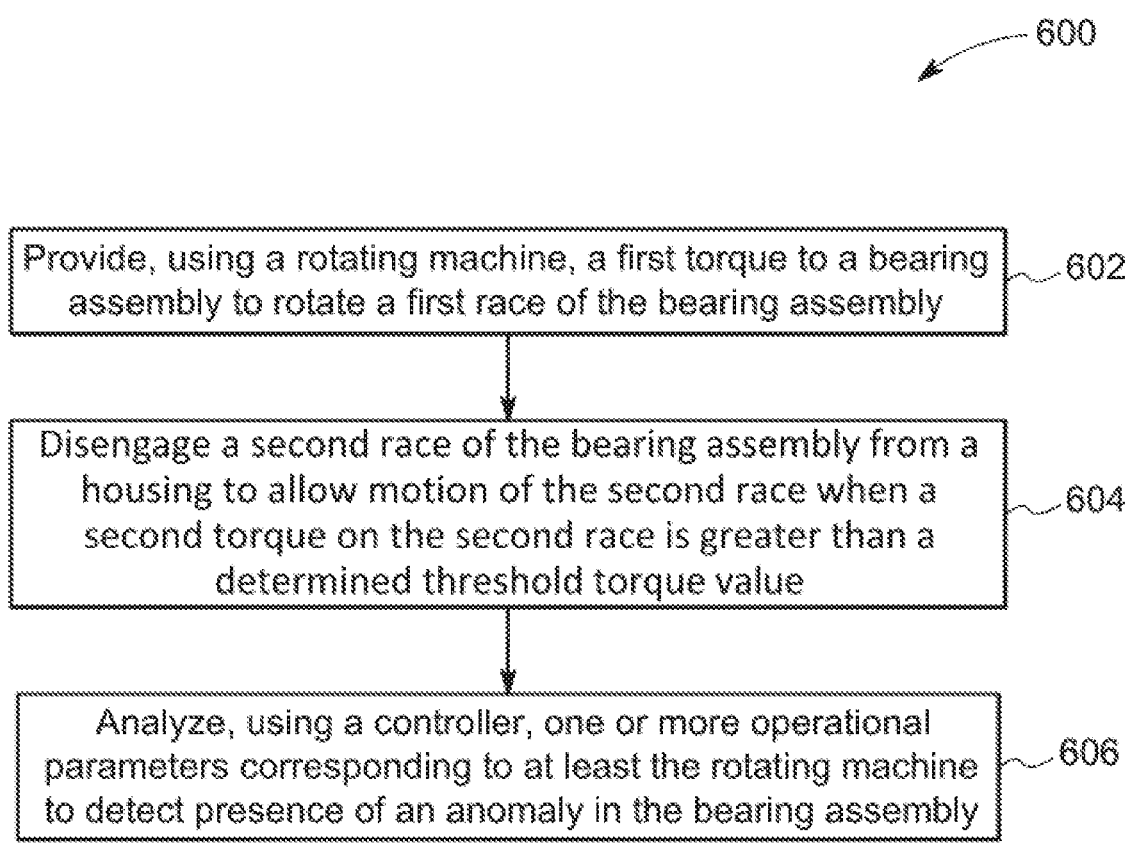
FIG. 6 is a flow chart representing a method of operating the system of FIG. 1 to detect an anomaly in a bearing assembly employed in the system, according to aspects of the specification.

FIG. 6 is a flow chart 600 representing a method of operating the system 100 of FIG. 1 to detect an anomaly in a bearing assembly employed in the system, according to aspects of the specification. In particular, FIG. 6 represents a method of operating a drive train to detect an anomaly in the bearing assembly employed in the drive train. The method of FIG. 6 is described with respect to components of FIGS. 1 and 2.

The method begins at step 602, where a first torque is provided to the bearing assembly 108 to rotate the first race 202 of the bearing assembly 108. In one example, the bearing assembly 108 is coupled to the rotor 120 of the rotating machine 110. In particular, the first race 202 of the bearing assembly 108 is coupled to the rotor 120 of the rotating machine 110. During a normal operating condition, when the first torque is provided to the bearing assembly 108, the first race 202 rotates. As a result, the rotor 120 of the rotating machine 110 coupled to the first race 202 rotates. The term "first torque," as used herein, refers to a torque applied to the first race 202.

In the event of an anomaly in the bearing assembly 108, the first race 202 may be in a locked state. Hence, even if the first torque is provided to the first race 202, the first race 202 may not rotate. As a result, a torque incident on the second race 204 and the plurality of support structures 210 increases. As noted above, the second race 204 is held in a stationary position using the support structures 210. In particular, the second race 204 is coupled to the housing 208 of the bearing assembly 108 using the support structures 210.

At step 604, the second race 204 of the bearing assembly 108 is disengaged from the housing 208 to allow motion of the second race 204 when a second torque on the second race 204 is greater than a determined threshold torque value. The term "second torque," as used herein, refers to a torque applied to the second race 204. In the event of the anomaly in the bearing assembly 108, at a certain instance in time, the second torque on the second race 204 is greater than the determined threshold torque value for the second race 204. In such a scenario, the torque on the support structures 210 is greater than the determined threshold torque value for the support structures 210. In such a scenario, the support structures 210 shear and the second race 204 is disengaged from the housing 208. As a result of the disengagement of the second race 204, the second race 204 is configured to transition from a stationary state to a dynamic state. The term "stationary state," as used herein, is a state in which the second race does not move. The term "dynamic state," as used herein, is a state in which the second race is subject to motion, such as rotary motion, linear motion, and the like. In one embodiment, as a result of the disengagement of the second race 204, the second race 204 is displaced into clearance gap of the bearing assembly 108 and the second race 204 begins to rotate. Further, the disengaged second race 204 in the dynamic state is configured to anomalously rotate the rotor 120 of the rotating machine 110. In one example, the rotor 120 may rotate eccentrically.

The eccentric rotation of the rotor 120 results in an imbalance in the magnetic air gap of the rotating machine 110. As a result, operational parameters of the rotating machine 110 change. In one embodiment, the eccentric rotation of the rotor 120 causes the operational parameters of other components of the drive train 102 to vary.

Furthermore, at step 606, the one or more of the operational parameters corresponding to at least the rotating machine 110 are analyzed using the controller 106 to detect the presence of anomalies in the bearing assembly 108. The operational parameters of the drive train 102 include a current of the rotating machine 110, a speed of the rotating machine 110, a torque of the rotating machine 110, a vibration signal of a transmission gear 114, an acoustic signal of the transmission gear 114, or combinations thereof. It may be noted that the current of the rotating machine 110 may include harmonics and a fundamental component of current.

In one embodiment, the operational parameters of the drive train are measured using the sensor 104. Further, the operational parameters of the drive train 102 are analyzed by the controller 106 to identify the anomaly in the bearing assembly 108. The anomaly in the bearing assembly 108 includes a locked state of the first race 202, motion of the second race 204, clogged rollers 206 of the bearing assembly 108, or combinations thereof.

In one example, the analysis of the operational parameters includes identifying an alternating component of a speed of the transmission gear at a meshing frequency. The term "meshing frequency," as used herein, refers to a gear-mesh frequency or a tooth-mesh frequency. The meshing frequency is equal to a product of a number of teeth of a transmission gear and revolutions per minute of the transmission gear. In one embodiment, identification of the alternating component of velocity of the transmission gear at the meshing frequency aids in identification of the anomaly in the bearing assembly 108.

During a normal operating condition of the bearing assembly 108, an alternating component of velocity may not appear at the meshing frequency. In another example, during the normal operating condition of the bearing assembly 108, an alternating component of velocity may appear only at nominal levels at the meshing frequency. Appearance of the alternating component of velocity at elevated or modulated levels at the meshing frequency may be representative of an anomaly in the bearing assembly.

In another example, an anomaly in the bearing assembly 108 is detected by comparing the alternating component of velocity at or near the meshing frequency to prior or historical alternating components of velocity at or near the meshing frequency. In one example, the historical alternating component of velocity at or near the meshing frequency has a nominal value and it is indicative of a non-anomalous condition of the bearing assembly 108. If a present measurement of alternating component of velocity at or near the meshing frequency deviates substantially from the historical alternating component of velocity at or near the meshing frequency, it may be indicative of an anomaly in the bearing assembly.

In another example, the analysis of the operational parameters includes identifying at a determined time interval a spectral component of a current of the rotating machine 110. The current of the rotating machine 110 is an alternating current (AC). In one scenario, the spectral component of the current of the rotating machine 110 is determined at a rate of once per revolution of the rotor 120. In one embodiment, the spectral component of current may be periodic in occurrence. The term "spectral component," as used herein, refers to a component of a signal that ranges outside an assigned interval of frequencies for that signal. In one embodiment, the identification of the spectral component of the current of the rotating machine 110 at the determined time interval aids in identification of an anomaly in the bearing assembly 108.

It may be noted that during a normal operating condition of the bearing assembly 108, a spectral component of current of the rotating machine 110 may not be identified during the determined time interval, thereby indicating a non-anomalous condition of the bearing assembly 108. However, identification of the presence of a spectral component of current of the rotating machine 110 during the determined time interval may be representative of an anomaly in the bearing assembly 108. Signal processing techniques, such as fast Fourier transformation (FFT) techniques and envelop demodulation techniques may be employed for identification of the presence of a spectral component of current of the rotating machine 110.

In yet another example, the analysis of the operational parameters includes identifying a time instant representative of initiation of motion of the second race 204. Additionally, at step 606, remaining operational life of the bearing assembly 108 may be determined based on the identified time instant. It may be noted that a time period for which the second race 204 operates as a rotational element of the bearing assembly 108 is pre-determined based on a design of the bearing assembly 108. In one example, the time period for which the second race 204 operates as a rotational element of the bearing assembly 108 may be about 6 hours. In this example, the second race 204 may break down and may not rotate after the 6 hour time period has elapsed. The remaining operational life of the bearing assembly 108 may be determined based on the identified time instant representative of initiation of motion of the second race 204 and the predetermined time period for which the second race 204 operates as the rotational element of the bearing assembly 108. The remaining operational life of the bearing assembly 108 may be defined as a difference between the predetermined time period during which the second race 204 operates as the rotational element of the bearing assembly 108 and the identified time instant representative of initiation of motion of the second race 204.

During the remaining operational life of the bearing assembly 108, the operating condition of the bearing assembly 108 is monitored based on the analysis of the operational parameters of the drive train 102. In one example, if based on the analysis of the operational parameters of the drive train 102 it is determined that condition of the bearing assembly 108 is deteriorating at a rapid rate, at least a speed of rotation of the bearing assembly 108, the first torque of the bearing assembly 108, or a combination thereof may be modified. In one example, the speed of rotation of the bearing assembly 108 is reduced by reducing a speed of an associated engine. In this example, reduction in the speed of the associated engine aids in delaying a rate of deterioration of the bearing assembly 108.

Implementing the method 600 as described with reference to FIG. 6, aids in the detection of anomalies in the bearing assembly 108 without the use of additional sensors or signal processing techniques. Also, the method 600 of FIG. 6 aids in moving the vehicle even in the event of an anomaly (e.g., fault) in the bearing assembly 108, such as a locked state of the first race 202 of the bearing assembly 108.

The foregoing process steps may be implemented by suitable code on a processor-based system such as a general-purpose or special-purpose computer. It should also be noted herein that some or all of the steps described herein may be performed in different orders or concurrently. Furthermore, the functions may be implemented in a variety of programming languages including but not limited to C++ or Java. Such codes may be stored or adapted for storage on one or more tangible, machine readable media such as on data repository chips, local or remote hard disks, optical disks (CDs or DVDs), memory or other media, which may be accessed by the processor-based system to execute the stored code. The tangible media may include paper or other suitable mediums upon which the instructions are printed. The instructions may be electronically captured via optical scanning of the paper or other medium, then compiled, interpreted or otherwise processed in a suitable manner if necessary, and then stored in the data repository or memory.

The control methods and routines disclosed herein may be stored as executable instructions in non-transitory memory and may be carried out by a control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various vehicle hardware components in combination with the electronic controller.

In accordance with the embodiments discussed herein, a system having an exemplary bearing assembly and a method of operating the system having the exemplary bearing assembly are presented. Use of the exemplary bearing assembly aids in operating the bearing assembly with the second race as the rotation element in the event of a locked state of the first race. The rotation of the second race causes an eccentric rotation of the rotor of the rotating machine coupled to the bearing assembly. The eccentric rotation of the rotor of the rotating machine causes variation in the operational parameters of the drive train, such as the operational parameters of the rotating machine and associated transmission gears. The operational parameters of the drive train are monitored and analyzed to identify the presence of anomalies in the bearing assembly. Existing sensors and signal processing techniques are employed to monitor and analyze the operational parameters to identify anomaly in the bearing assembly.

Further, the exemplary bearing assembly can be employed in systems such as vehicles. The vehicles may be a locomotive, an off-highway vehicle, and the like. In the vehicle employing the exemplary bearing assembly, the transportation of the vehicle is not hindered even when the bearing assembly fails. Thus, the vehicle may be transported without need for hoisting the vehicle to the repair facility and cutting of axle of the vehicle on the road/track, if desired.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

As used herein, the term "substantially" is construed to mean plus or minus five percent of the range unless otherwise specified.

The invention claimed is:

1. A bearing assembly, comprising:
a first race;
a second race disposed concentric to the first race, wherein the second race has a radius that changes along an axial length of the bearing assembly;
a housing disposed around the second race and operatively coupled to the second race; and
a plurality of support structures configured to detachably couple the second race to the housing, wherein the plurality of support structures are configured to disengage the second race from the housing to allow motion of the second race when a torque on the second race is greater than a threshold torque value;
wherein the bearing assembly is operatively coupled to at least one of a rotating machine and a transmission gear and wherein at least one of the rotating machine and the transmission gear is coupled to a sensor; and
wherein a disengaged second race is configured to transition from a stationary state to a dynamic state and wherein the disengaged second race in the dynamic state is configured to anomalously rotate at least a rotor of the rotating machine.

2. The bearing assembly of claim 1, wherein the second race is a monolithic structure.

3. The bearing assembly of claim 1, wherein the second race comprises:
a cylindrical subunit; and
a sleeve disposed around the cylindrical subunit, wherein the sleeve has a tapered outer surface.

4. The bearing assembly of claim 1, further comprising a coupling device disposed between a first end of the second race and the housing, wherein the coupling device is configured to displace the second race into a clearance gap between a second end of the second race and the housing to allow the motion of the second race.

5. The bearing assembly of claim 1, further comprising an interface layer disposed on at least one of an outer surface of the second race and an inner surface of the housing, wherein the interface layer is configured to hold a lubricant.

6. The bearing assembly of claim 1, wherein the sensor comprises a speed sensor, a current sensor, a voltage sensor, an acoustic sensor, a vibration sensor, or combinations thereof; and
wherein the sensor is configured to measure one or more operational parameters of at least one of the rotating machine and the transmission gear, wherein the one or more operational parameters of at least one of the rotating machine and the transmission gear comprise a current of the rotating machine, a speed of the rotating machine, a torque of the rotating machine, a vibration signal of the transmission gear, an acoustic signal of the transmission gear, or combinations thereof.

7. The bearing assembly of claim 6, wherein the bearing assembly is operatively coupled to a controller, wherein the controller is configured to analyze the one or more operational parameters to identify a presence of an anomaly, and wherein the anomaly comprises the motion of the second race, a locked state of the first race, a plurality of clogged rollers of the bearing assembly, or combinations thereof.

8. A method, comprising:
providing, using a rotating machine, a first torque to a bearing assembly to rotate a first race of the bearing assembly;
disengaging a second race of the bearing assembly from a housing to allow motion of the second race when a second torque on the second race is greater than a threshold torque value; and
analyzing, using a controller, one or more operational parameters corresponding to at least the rotating machine to detect a presence of an anomaly in the bearing assembly.

9. The method of claim 8, further comprising displacing, using a coupling device disposed between a first end of the second race and the housing, the second race into a clearance gap between a second end of the second race and the housing to allow the motion of the second race.

10. The method of claim 8, wherein disengaging the second race comprises shearing a plurality of support structures to detach the second race from the housing.

11. The method of claim 10, wherein disengaging the second race of the bearing assembly from the housing comprises:
transitioning the second race from a stationary state to a dynamic state; and
anomalously rotating at least a rotor of the rotating machine based on the dynamic state of the second race;
wherein anomalously rotating at least the rotor of the rotating machine comprises eccentrically rotating the rotor of the rotating machine.

12. The method of claim 8, wherein the one or more operational parameters corresponding to at least the rotating machine comprise a current of the rotating machine, a speed of the rotating machine, a torque of the rotating machine, or combinations thereof.

13. The method of claim 8, further comprising measuring the one or more operational parameters using a sensor.

14. The method of claim 8, wherein analyzing the one or more operational parameters comprises identifying an alternating component of a velocity of the rotating machine at a meshing frequency.

15. The method of claim 8, wherein analyzing the one or more operational parameters comprises identifying at a time interval a spectral component of a current of the rotating machine.

16. The method of claim 8, wherein analyzing the one or more operational parameters further comprises:
identifying a time instant representative of initiation of the motion of the second race; and
determining a remaining operational life of the bearing assembly based on the identified time instant.

17. The method of claim 16, further comprising:
determining an operating condition of the bearing assembly during the remaining operational life of the bearing assembly based on an analysis of the one or more operational parameters; and
modifying at least a speed of rotation of the bearing assembly, the first torque of the bearing assembly, or a combination thereof based on the operating condition of the bearing assembly.

18. A system, comprising:
a bearing assembly comprising:
a first race;
a second race disposed concentric to the first race, wherein the second race has a radius that changes along an axial length of the bearing assembly;
a housing disposed around the second race and operatively coupled to the second race; and
a plurality of support structures configured to detachably couple the second race to the housing, wherein the plurality of support structures are configured to disengage the second race from the housing to allow motion of the second race when a torque on the second race is greater than a threshold torque value;
a rotating machine operatively coupled to the bearing assembly; and
a controller configured to analyze one or more operational parameters corresponding to at least the rotating machine to detect a presence of an anomaly in the bearing assembly.

* * * * *